E. COLLETT.
PROCESS OF CONCENTRATING AQUEOUS LIQUIDS.
APPLICATION FILED NOV. 25, 1913.
1,184,926.
Patented May 30, 1916.
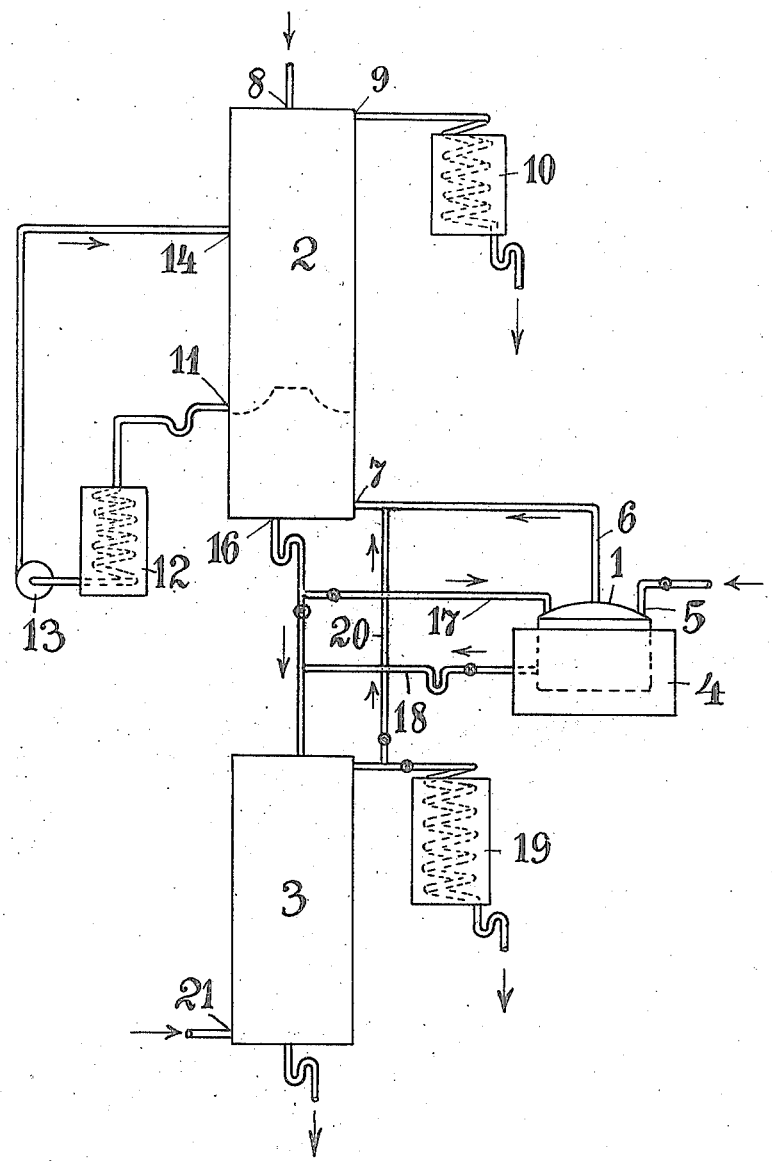

UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF CONCENTRATING AQUEOUS LIQUIDS.

1,184,926.      Specification of Letters Patent.      Patented May 30, 1916.

Application filed November 25, 1913. Serial No. 803,068.

*To all whom it may concern:*

Be it known that I, EMIL COLLETT, a subject of the King of Norway, residing at Christiania, Norway, have invented certain new and useful Improvements in Processes of Concentrating Aqueous Liquids; and I do hereby declare the following to be a full, clear, and exact description of the invention, such as will enable others skilled in the art to which it appertains to make and use the same.

This invention has for its object a process of drying liquids, gases and vapors.

It is known to concentrate aqueous liquids by mixing the same with drying agents and then expelling the same from the mixture by treating the latter in opposed current with hot gases, steam, etc. The known processes, however, have several drawbacks and imperfections. Thus if using hot gases for expelling the liquids to be concentrated, the vapors obtained will be mixed up and diluted with these gases and the condensing apparatus will consequently be excessively large; if steam be used, the drying agents will thereby be highly diluted so that in concentrating the same not only the water absorbed from the liquid but also the water from the condensed steam will have to be removed. It has also been proposed to bring vapors in a different manner, e. g. in accordance with common practice in laboratories, into contact with drying agents for the purpose of obtaining a concentration of the vapors. Various difficulties, however, are thereby encountered, e. g. on account of the reaction between the diluted vapors and the drying agents the latter will be excessively heated, or if part of the reaction heat be removed by cooling at all points where the vapors and the drying agent are in contact with each other, the drying agent will absorb a portion of the vapors whereby losses will arise owing to the fact that the drying agent on leaving the drying apparatus will carry with it a portion of the liquids supplied. It is a matter of great importance to avoid such loss in a practical manner. Also it is of great importance to rationally utilize the heat set free by the reaction between the evaporated dilute liquid and the drying agent. The ways hitherto adopted to utilize said heat have not proved to be advantageous.

Applicant has now found that for drying aqueous liquids, such as dilute nitric acid, in the most rational manner, the process may be adopted which is hereinafter described: The nitric acid to be concentrated is boiled in a distilling apparatus adapted for indirect heating, e. g. a boiler with external heating. The nitric acid vapors thereby formed are conducted to a drying apparatus in opposed current with a drying agent, such as sulfuric acid, whereby the water of the vapors, if the temperature in the apparatus is a suitable one, will be taken up in the sulfuric acid so that vapors of pure concentrated nitric acid will escape from the drying apparatus. Said nitric acid is then condensed in suitable apparatus.

In such an apparatus the following process will take place, providing that it operates as desired, that is, that the nitric acid vapors, that escape, are practically free from water. In the top part of the apparatus nitric acid vapors mixed with some aqueous vapor will encounter sulfuric acid of high concentration. As the sulfuric acid will absorb aqueous vapor, heat will be developed. The lower, the point at which this takes place in the apparatus, the greater the development of heat. Simultaneously with absorbing water, however, the sulfuric acid will also absorb some nitric acid especially if it is cold. If this takes place in the top part of the apparatus it will have no essentially detrimental effect on the process, for the matter especially of importance in said portion of the apparatus is that the nitric acid vapor may escape practically free from water. It is not prejudicial for this purpose that the temperature of the sulfuric acid in the top portion of the apparatus differs considerably from the temperature of the nitric acid vapors which it encounters, on the contrary, this will increase the drying effect of the acid. In the bottom portion of the apparatus highly aqueous nitric acid vapors will encounter dilute sulfuric acid, containing considerable quantities of nitric acid (absorbed in the course of the process). The sulfuric acid having at this point but little capacity of absorbing water from the nitric acid vapors, the object of this part of the apparatus is materially different from that of the top portion of the apparatus. Since the sulfuric acid that leaves the apparatus, must be freed of its content of nitric acid, before it is subjected to concentration, in order that it may again be introduced in the apparatus at the top of the same, it is a matter of importance that its content of nitric acid should be small as possible. It is therefore the main object of the bottom portion of the apparatus to free the sulfuric acid of the nitric acid absorbed in the course of the process. This may be attained by maintaining the temperature in this portion of the apparatus as high as possible without causing a dissociation of the nitric acid. At this high temperature most of the nitric acid contained in the sulfuric acid is expelled, and said nitric acid vapors will ascend, together with those that have been introduced in the apparatus, into the central portion of the apparatus. It is chiefly in this portion of the apparatus (the central portion) that the drying of the nitric acid vapors takes place. By the sulfuric acid absorbing water such a considerable amount of heat is developed that the process, as is well known, cannot be carried out in a rational manner without the use of a rather energetic cooling. Now in order to enable the cooling of the apparatus to be effected in such a way that the above-mentioned useful working conditions for the two extreme portions may be obtained, the process is adopted according to the invention that, at a suitable point of the apparatus, so much hot liquid is withdrawn—which is again introduced in cooled condition at a higher point—that the amount of heat removed by the cooling will correspond to the heat developed in the drying zone proper. Since there should preferably be sulfuric acid (or some other drying agent) of the highest possible concentration in the very top portion of the apparatus, it is preferred to introduce the cooled liquid above referred to (which will generally contain a considerable amount of water) not at the top of the apparatus, but at a point lower down, the concentrated sulfuric acid being introduced in a cold condition at the top. If the apparatus is operated in this manner, a zone will consequently be obtained in the same, in which, besides the liquid passing through the apparatus, a constant quantity of liquid will circulate the object of which is a double one: to act as a drying agent together with the comparatively slight quantity of concentrated drying agent which is constantly added at the top, and to maintain the temperature in this portion of the apparatus so low as to enable the drying agent to perform its work at its degree of concentration at that point. Besides cooling this liquid while it is circulating, its percentum composition may also if desired be varied by a suitable process (e. g. removing nitric acid by denitration).

The system above described is not in itself complete. To make it complete there will have to be connected with the apparatus devices for the denitration and concentration of the sulfuric acid flowing out at the bottom and containing a slight amount of nitric acid, which apparatus should be constructed with a view to utilizing to the best advantage the heat set free in the drying apparatus.

With the process described it is, as already mentioned possible to obtain the drying agent on leaving the drying apparatus nearly free from nitric acid. Still quite small quantities of nitric acid, however, will easily be carried along therewith. To recover the same a denitration may be carried out in the usual manner directly in connection with the drying process. This may be effected by conducting the drying agent passing from the drying apparatus, to a denitrating column in which the denitration takes place in a known manner. Since, however, the quantities of nitric acid contained in the drying agent, are small, and the temperature of the drying agent is high, the denitration in this case may be obtained by blowing in small quantities of cold air. In this way an essential proportion of the heat set free in the drying apparatus will be directly utilized. An important point of the present process is, moreover, the manner in which the vapors from the denitrating apparatus are treated. The same may either be conducted directly into the drying apparatus and through the latter in order to be condensed together with the bulk of the nitric acid. Or they may be conducted through the distilling apparatus together with the vapors from the same, to the drying apparatus. Finally the vapors of denitration may also be condensed and supplied to the drying apparatus at a suitable point whereby also a cooling of the drying apparatus is attained. By this process all the nitric acid supplied to the distilling apparatus and evaporated in the same, is obtained as concentrated acid.

The drying agent passing from the drying apparatus may also be treated in a different manner, from the one above described, as it can be caused to flow directly to the distilling apparatus if desired in mixture with the nitric acid to be concentrated. In this case the nitric acid is distilled from the mixture, only mixed with relatively small amounts of aqueous vapor, the bulk of water being absorbed by the drying agent in the distilling apparatus. From the distilling apparatus the drying agent then flows to the denitrating apparatus in which the further treatment takes place in the manner above referred to. Of course the distilling apparatus may also be supplied with a drying agent from other sources than the drying apparatus. By proceeding in this manner less aqueous vapor is produced in the drying apparatus, while at the same time less supply of heat is required to the distilling apparatus.

It may also in special instances be of great advantage to utilize the heat contained in the drying agent, passing from the drying apparatus or distilling apparatus, respectively, and to again concentrate said agent. This concentration is effected by conducting the hot drying agent to a concentrating apparatus of known construction, for instance a concentrating column, to which it is supplied at the top of the apparatus, the necessary quantity of air or other gases being blown in at the bottom and according to circumstances in a heated condition. The vapors issuing from the concentrating apparatus of course in this case are not conducted into the drying apparatus, but are separately condensed, and since they may contain small quantities of nitric acid, the condensate is suitably used for the production of nitric acid, it being conducted to those apparatus in which for instance the absorption of nitrous gases from electric furnaces takes place.

As a drying agent in the processes above described is suitably employed sulfuric acid; as a matter of course also other water-binding substances may be used, such as for instance phosphoric acid, arsenic acid, anhydrous nitrates, etc.

In the drawing, 1 is a distilling vessel, 2 is the drying apparatus, and 3 is a denitration column. The vessel 1 is heated by means of steam or other suitable heating agent supplied to the jacket 4 surrounding the vessel. Dilute nitric acid is introduced at 5. Nitric acid vapors leave the vessel through the pipe 6 and are introduced into the drying column at 7. Concentrated sulfuric acid is introduced into the drying column at 8. Concentrated nitric acid vapors leave the column at 9 and pass into the condenser 10. At a point 11 situated at a distance from the bottom of the column corresponding to about one-third of the length of the column a quantity of drying agent is withdrawn. The liquid is drawn through a cooler 12, from which it is forced by means of a pump 13 into the column at a point 14 distant from the top of the column about one-third of the whole length of the same. Dilute sulfuric acid flows out from the drying column through the pipe 16 and is introduced into the denitration column either directly, or indirectly by way of pipe 17, the vessel 1, and pipe 18. Vapors from the denitration column pass either directly into the condenser 19, or through pipe 20 back into the drying column at 7. Hot gases or vapors are introduced into the denitration column at 21.

When working in the manner above described, not only the advantages hereinbefore referred to are obtained above the known methods, namely, that the denitrating apparatus may be made very small or be entirely done away with, that the drying may be effected with a minimum amount of drying agent, and that a quantitative output of the nitric acid is obtained, but also the fact that on account of the rational utilization of the apparatus the plant may be given the smallest possible dimensions so that the expense of construction and operation will be considerably reduced.

I claim—

1. The process of concentrating aqueous liquids which consists in evaporating the liquid by indirect heating, conducting the vapors so obtained to the lower end of a drying apparatus charged with drying agent and maintaining the middle portion of the said apparatus at a temperature suitable for the drying process by drawing off at a suitable point a portion of the liquid flowing down through the apparatus, cooling it and introducing it again at a higher point in the apparatus.

2. The process of concentrating aqueous liquids which consists in evaporating the liquid by indirect heating, conducting the vapors so obtained to the lower end of a drying apparatus charged with drying agent and maintaining the middle portion of the said apparatus at a temperature suitable for the drying process by drawing off at a suitable point a portion of the liquid flowing down through the apparatus cooling it and introducing it again at a higher point in the apparatus, the said portion of the liquid being drawn off from the apparatus at such a distance above the lower end of the same that the temperature below this point becomes sufficiently high to effect the evaporation of the water taken up by the drying agent so that this latter leaves the apparatus in the purest possible condition.

3. The process of concentrating aqueous liquids which consists in evaporating the liquid by indirect heating, conducting the vapors so obtained to the lower end of a drying apparatus charged with drying agent and maintaining the middle portion of the said apparatus at a temperature suitable for the drying process by drawing off at a suitable point a portion of the liquid flowing down through the apparatus, cooling it and introducing it again at a higher point in the apparatus, maintaining the highly concentrated drying agent introduced at the top of the apparatus at such a low temperature, that the cooling liquid could be introduced only at a certain distance from the upper end whereby the vapors in the upper part of the apparatus are subjected only to a most energetically acting drying agent.

4. The process of concentrating aqueous liquids which consists in evaporating the liquid by indirect heating, conducting the vapors so obtained to the lower end of a drying apparatus charged with drying agent, and maintaining the middle portion of said apparatus at a temperature suitable for the drying process by drawing off at a suitable point a portion of the liquid flowing down through the apparatus, cooling the withdrawn liquid and introducing it again at a higher point in the apparatus, and introducing said drying agent into the body of liquid to be evaporated, the vapors of said body of liquid being introduced into the drying apparatus.

5. In the process of concentrating aqueous liquids by causing vapors of such liquids to come into contact with a liquid drying agent in a drying apparatus, the step which consists in conducting the drying agent after having passed through said apparatus and containing vapor other than water vapor into the body of liquid being vaporized for supplying said apparatus with vapors to be dried.

6. The process of concentrating nitric acid, which comprises distilling weak acid, conducting the vapor thereof to a drying apparatus charged with a liquid drying agent, maintaining the middle portion of said apparatus at a temperature suitable for the drying process by drawing off at a suitable point a portion of the drying liquid flowing through said apparatus, cooling it, introducing it again at an advanced point of the apparatus, treating the diluted drying agent from the apparatus to separate the absorbed nitric acid gas, returning the so recovered nitric acid gas to said apparatus with the distillation vapors.

In testimony that I claim the foregoing as my invention, I have signed my name in presence of two subscribing witnesses.

EMIL COLLETT.

Witnesses:
  M. E. GUBBORNSEN,
  RUTH LINDSTIAN.